(12) United States Patent
Saez Moreno

(10) Patent No.: US 12,480,466 B2
(45) Date of Patent: Nov. 25, 2025

(54) BLADE FOR A ROTOR OF A WIND TURBINE COMPRISING INTERNALLY A CONTINOUS CABLE ARRANGEMENT INTENDED TO MEASURE CONDUCTIVITY

(71) Applicant: Siemens Gamesa Renewable Energy Innovation & Technology S.L., Sarriguren (ES)

(72) Inventor: Alejandro Saez Moreno, Navarra (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 18/016,621

(22) PCT Filed: Jun. 30, 2021

(86) PCT No.: PCT/EP2021/067981
§ 371 (c)(1),
(2) Date: Jan. 17, 2023

(87) PCT Pub. No.: WO2022/022933
PCT Pub. Date: Feb. 3, 2022

(65) Prior Publication Data
US 2023/0296076 A1     Sep. 21, 2023

(30) Foreign Application Priority Data
Jul. 30, 2020   (EP) ..................................... 20382698

(51) Int. Cl.
*F03D 17/00*     (2016.01)
*F03D 1/06*      (2006.01)
*F03D 80/30*     (2016.01)

(52) U.S. Cl.
CPC .......... *F03D 1/0675* (2013.01); *F03D 17/00* (2016.05); *F03D 80/30* (2016.05); *F05B 2260/83* (2013.01); *Y02E 10/72* (2013.01)

(58) Field of Classification Search
CPC ........ F03D 1/0675; F03D 17/00; F03D 80/30; F05B 2260/83; Y02E 10/72
See application file for complete search history.

(56) References Cited

U.S. PATENT DOCUMENTS 7,508,186 B2 * 3/2009 Mortensen ............. H02G 13/00
324/72
10,215,163 B2 * 2/2019 Søgaard .................. F03D 80/30
(Continued)

FOREIGN PATENT DOCUMENTS

CN    100402842 C    7/2008
CN    102486156 A    6/2012
(Continued)

OTHER PUBLICATIONS

Deshmukh et al. "Advanced Fluoropolymer Nanocomposites", 2023, Science Direct (Year: 2023).*

(Continued)

*Primary Examiner* — Andrew J Marien
(74) *Attorney, Agent, or Firm* — Schmeiser, Olsen & Watts LLP

(57) ABSTRACT

A blade includes inwardly a continuous cable arrangement intended to measure conductivity for blade lightning protection, wherein the cable arrangement includes an upper portion and a lower portion extending therebetween the blade root and the blade tip, the lower portion electrically in contact with the upper portion closing an electrical loop, and wherein the blade further includes an electrical connector element located at the blade root and electrically in contact with the upper portion and the lower portion, the electrical
(Continued)

connector element protruding exteriorly on the blade root so that conductivity of the blade is measured.

16 Claims, 1 Drawing Sheet

(56) References Cited

U.S. PATENT DOCUMENTS

| | | | | |
|---|---|---|---|---|
| 10,465,662 | B2* | 11/2019 | Søgaard | F03D 80/30 |
| 2003/0170122 | A1 | 9/2003 | Wobben | |
| 2009/0038819 | A1 | 2/2009 | Molbech | |
| 2009/0039650 | A1* | 2/2009 | Nies | F03D 80/40 |
| | | | | 290/55 |
| 2011/0142644 | A1* | 6/2011 | Fritz | F03D 1/0675 |
| | | | | 416/146 R |
| 2011/0142671 | A1 | 6/2011 | Fritz et al. | |
| 2012/0133146 | A1* | 5/2012 | Naka | H02G 13/00 |
| | | | | 73/170.24 |
| 2013/0022465 | A1* | 1/2013 | Stiesdal | B64D 15/12 |
| | | | | 416/95 |
| 2015/0292487 | A1* | 10/2015 | Ohlerich | F03D 1/0675 |
| | | | | 416/146 R |
| 2016/0245264 | A1 | 8/2016 | Sogaard et al. | |
| 2016/0258423 | A1* | 9/2016 | Whitehouse | F03D 1/0675 |
| 2016/0281687 | A1 | 9/2016 | Sogaard et al. | |
| 2018/0048136 | A1 | 2/2018 | Aspas Puertolas et al. | |
| 2018/0180031 | A1* | 6/2018 | Klein | H02G 13/40 |
| 2019/0383272 | A1 | 12/2019 | Murata et al. | |

FOREIGN PATENT DOCUMENTS

| | | |
|---|---|---|
| CN | 108414835 A | 8/2018 |
| CN | 105545615 B | 2/2019 |
| DE | 102005017865 A1 | 11/2006 |
| EP | 3623617 A1 | 3/2020 |

OTHER PUBLICATIONS

PCT International Search Report and Written Opinion of International Searching Authority mailed Oct. 1, 2021 corresponding to PCT International Application No. PCT/EP2021/067981 filed Jun. 30, 2021.

* cited by examiner

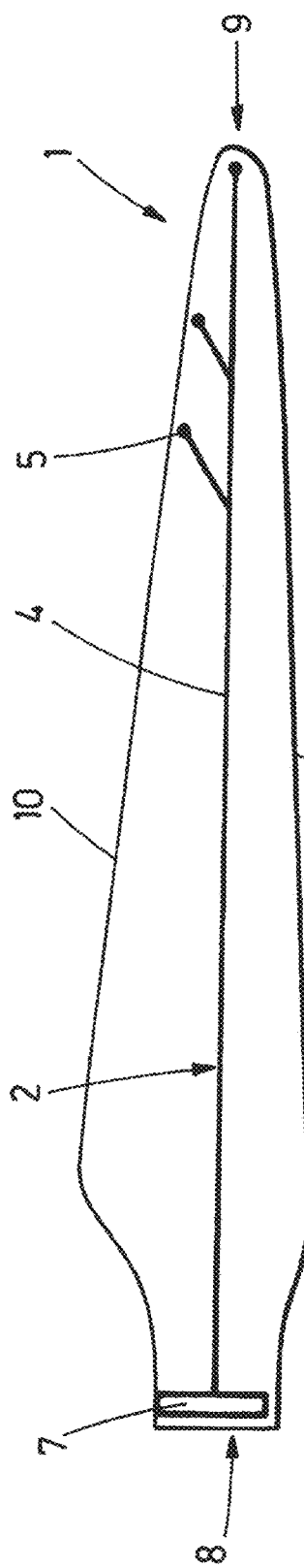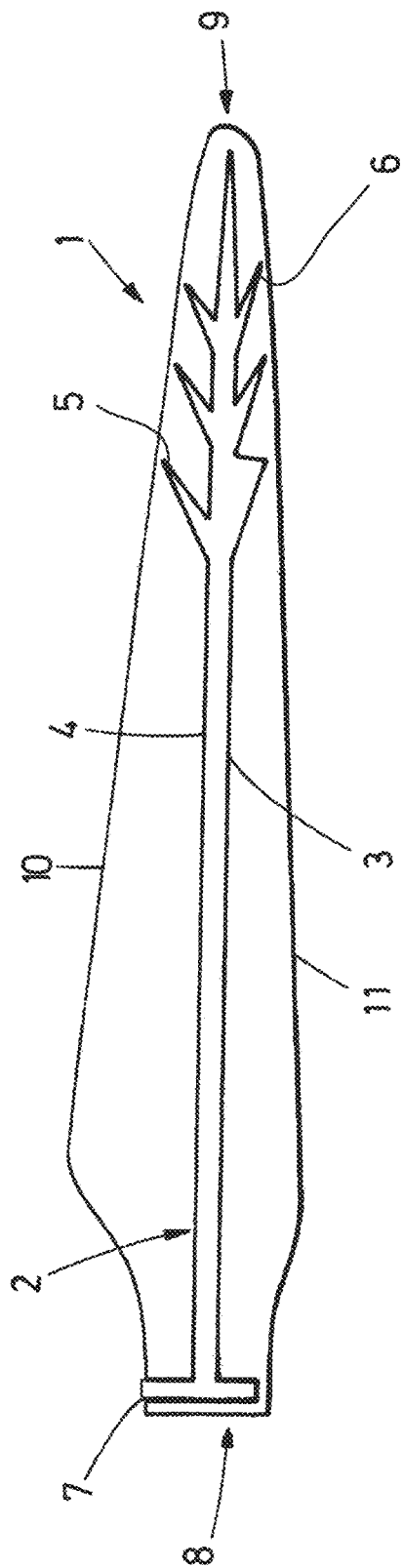

BLADE FOR A ROTOR OF A WIND TURBINE COMPRISING INTERNALLY A CONTINOUS CABLE ARRANGEMENT INTENDED TO MEASURE CONDUCTIVITY

CROSS-REFERENCE TO RELATED APPLICATIONS

This application claims priority to PCT Application No. PCT/EP2021/067981, having a filing date of Jun. 30, 2021, which claims priority to EP Application No. 20382698.7, having a filing date of Jul. 30, 2020, the entire contents both of which are hereby incorporated by reference.

FIELD OF TECHNOLOGY

The following is encompassed within the field of wind turbines blades and, more particularly, relates to a blade for a rotor of a wind turbine intended to measure conductivity for blade lightning protection thereof. The following is a wind turbine blade which ease reparation and conductivity level measurement during preventive and/or corrective maintenance by means of an inwardly continuous cable arrangement extending therebetween the blade root and the blade tip closing an electrical loop so that conductivity can be measured.

BACKGROUND

Blade Lightning Protection System (LPS) and check of conductivity along lifetime is a very expensive issue to be taken into account for both the preventive and corrective actions related to LPS incident. It is also a requirement from IEC standard and Certification approval as well as liabilities for blade lightning incidents.

Some wind turbines blades intended for blade lightning protections are known in the state of the art. However, all of said known blades require external blade connections through wires from blade root to blade tip receptor to proof that the conductivity levels are within the allowable tolerances. This requires a very costly operation in term of lack of production while the measurement is taking place as well as high level qualified technicians to perform blade external rope inspection just to place the wire in the right location.

Even the on-going development of drone assisted inspection requires a highly specific equipment to close the loop and measure conductivity level.

SUMMARY

A wind turbine blade is disclosed herein with which it has been found that at least the above disadvantages relating to the prior art solutions are mitigated.

More in particular, there is provided A blade for a rotor of a wind turbine comprising inwardly a continuous cable arrangement intended to measure conductivity for blade lightning protection, wherein said blade comprises a blade root, a blade tip, a leading edge and a trailing edge with a chord extending therebetween, characterized in that the cable arrangement comprises an upper portion and a lower portion extending there between the blade root and the blade tip, said lower portion electrically in contact with the upper portion closing an electrical loop thereof, and wherein the blade further comprises an electrical connector element located at the blade root and electrically in contact with the upper portion and the lower portion, said electrical connector element protruding exteriorly on the blade root so that conductivity of the blade can be measured.

The lower portion of the cable arrangement may comprise a plurality of nodes near the blade tip extending near the blade tip in the region towards the leading edge, so that conductivity can be more accurately measured the leading edge region on the blade tip.

According to any of the previous embodiments, the upper portion of the cable arrangement may also comprise a plurality of nodes near the blade tip, extending towards the trailing edge so that conductivity can be more accurately measured the trailing edge region on the blade tip.

Alternatively, the upper portion of the cable arrangement may comprise a concave configuration near the blade tip, extending towards the trailing edge.

Similarly, the lower portion of the cable arrangement may comprise a convex configuration near the blade tip, extending towards the leading edge.

BRIEF DESCRIPTION

Some of the embodiments will be described in detail, with reference to the following figures, wherein like designations denote like members, wherein:

FIG. 1 shows a front view of a blade cable arrangement to measure conductivity according to an embodiment known in the prior art; and FIG. 2 shows a front view of a preferred embodiment of the blade according to the invention where it is shown the cable arrangement comprising a upper portion and a lower portion electrically in contact with each other closing an electrical loop, and both connected to an electrical element protruding at the root.

DETAILED DESCRIPTION

What follows is a detailed description, with the help of the attached FIGS. 1-2 referenced above, a preferred embodiment of the invention and prior art solutions.

In FIG. 1, it is shown a solution known in the prior art, wherein the blade inwardly comprises a cable arrangement (2) intended to measure conductivity for blade lightning protection, wherein the cable arrangement (2) comprises a upper portion (4) extending therebetween the blade root (8) and the blade tip (9) and electrically in contact with an electrical connector element (7).

FIG. 2 illustrates a preferred embodiment of the present invention, wherein it is shown a blade for a rotor of a wind turbine comprising inwardly a continuous cable arrangement (2) intended to measure conductivity for blade lightning protection, wherein said blade (1) comprises a blade root (8), a blade tip (9), a leading edge (11) and a trailing edge (10) with a chord extending therebetween.

Furthermore, FIG. 2 illustrates a cable arrangement (2) comprising an upper portion (4) and a lower portion (3) extending there between the blade root (8) and the blade tip (9), said lower portion (3) electrically in contact with the upper portion (2) closing an electrical loop thereof.

FIG. 2 further illustrates an electrical connector element (7) located at the blade root (8) and electrically in contact with the upper portion (4) and the lower portion (3) wherein said electrical connector element (7) protrudes exteriorly on the blade root (8) so that conductivity of the blade (1) can be measured.

In a preferred embodiment shown in FIG. 2 both the upper portion (4) and the lower portion (3) of the cable arrangement (2) comprise nodes (5,6).

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade for a rotor of a wind turbine comprising:
inwardly, a cable arrangement configured to measure conductivity for blade lightning protection, a blade root, a blade tip, a leading edge and a trailing edge with a chord extending therebetween, wherein the cable arrangement comprises an upper portion and a lower portion extending between the blade root and the blade tip, the lower portion electrically in contact with the upper portion closing an electrical loop thereof, and
an electrical connector element located at the blade root and electrically in contact with the upper portion and the lower portion, the electrical connector element protruding exteriorly on the blade root so that a conductivity of the blade is measurable; and
a plurality of nodes that are each formed in a path of the electrical loop and located inside the blade, wherein the plurality of nodes are concentrated proximate the blade tip to measure the conductivity at the leading edge and the trailing edge on the blade tip;
wherein an end of the upper portion and an end of the lower portion are connected to and terminate at the electrical connector element, inside the blade;
wherein a cable forming the path of the electrical loop between the end of the upper portion and the end of the lower portion is a continuous path without branching off to other nodes.

2. The blade of claim 1, wherein the lower portion of the cable arrangement comprises nodes of the plurality of nodes near the blade tip extending towards the leading edge.

3. The blade of claim 1, wherein the lower portion of the cable arrangement comprises a convex configuration near the blade tip, extending towards the leading edge.

4. The blade of claim 1, wherein the upper portion of the cable arrangement comprises nodes of the plurality of nodes near the blade tip, extending towards the trailing edge.

5. The blade of claim 1, wherein the upper portion of the cable arrangement comprises a concave configuration near the blade tip, extending towards the trailing edge.

6. The blade according to claim 1, wherein the electrical loop is closed inside the blade.

7. The blade according to claim 1, wherein the upper portion and the lower portion the cable arrangement are fully contained inside the blade.

8. The blade according to claim 1, wherein the path of the electrical loop defined by the upper portion and the lower portion are fully contained inside the blade.

9. The blade according to claim 1, wherein the electrical connector element located at the blade root is the only externally accessible point to measure a conductivity of the blade.

10. The blade according to claim 1, wherein the plurality of nodes are located only proximate the blade tip.

11. A method comprising:
measuring a conductivity level during preventive and/or corrective maintenance by means of an cable arrangement extending therebetween a blade root and a blade tip of a rotor blade of a wind turbine, closing an electrical loop so that conductivity can be measured, the cable arrangement including:
an upper portion and a lower portion extending between the blade root and the blade tip, the lower portion electrically in contact with the upper portion closing the electrical loop thereof,
an electrical connector element located at the blade root and electrically in contact with the upper portion and the lower portion, the electrical connector element protruding exteriorly on the blade root so that the conductivity of the blade is measurable, and
a plurality of nodes formed in a path of the electrical loop and located inside the blade, wherein the plurality of nodes are concentrated proximate the blade tip to measure the conductivity at a leading edge and a trailing edge on the blade tip;
wherein an end of the upper portion and an end of the lower portion are connected to and terminate at the electrical connector element, inside the blade;
wherein a cable forming the path of the electrical loop between the end of the upper portion and the end of the lower portion is a continuous path without branching off to other nodes.

12. The method according to claim 11, wherein the electrical loop is closed inside the blade.

13. The method according to claim 11, wherein the upper portion and the lower portion the cable arrangement are fully contained inside the blade.

14. The method according to claim 11, wherein the path of the electrical loop defined by the upper portion and the lower portion are fully contained inside the blade.

15. The method according to claim 11, wherein the electrical connector element located at the blade root is the only externally accessible point to measure a conductivity of the blade.

16. The method according to claim 11, wherein the plurality of nodes are located only proximate the blade tip.

* * * * *